Sept. 6, 1966    J. M. MOUNTZ ETAL    3,271,664
COMBINED LEAKAGE FIELD AND EDDY CURRENT DETECTION SYSTEM
Filed Dec. 4, 1961    3 Sheets-Sheet 1

INVENTORS
John M. Mountz
John J. Flaherty
BY
Hill, Sherman, Meroni, Gross & Simpson
ATTORNEYS Sept. 6, 1966  J. M. MOUNTZ ET AL  3,271,664
COMBINED LEAKAGE FIELD AND EDDY CURRENT DETECTION SYSTEM
Filed Dec. 4, 1961  3 Sheets-Sheet 2

INVENTORS
John M. Mountz
John J. Flaherty
BY
Hill, Sherman, Meroni, Gross & Simpson
ATTORNEYS

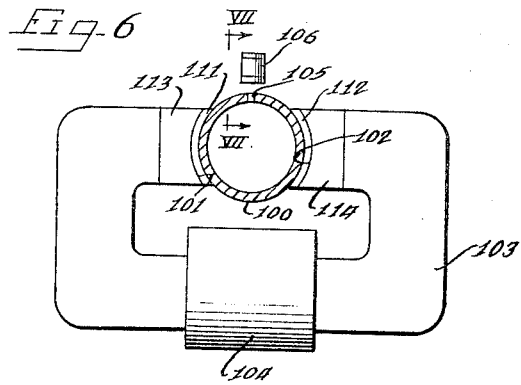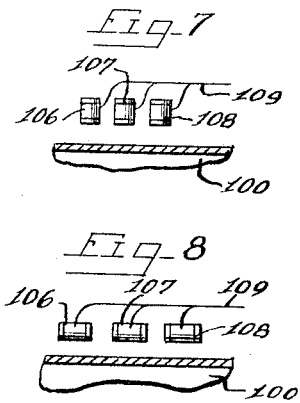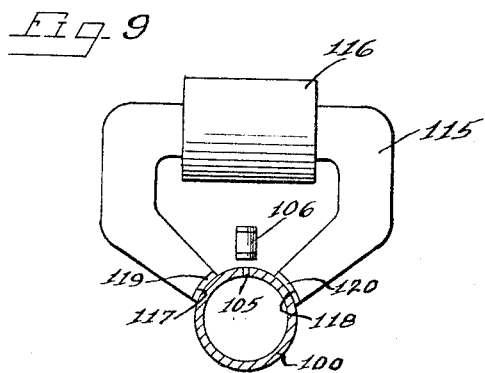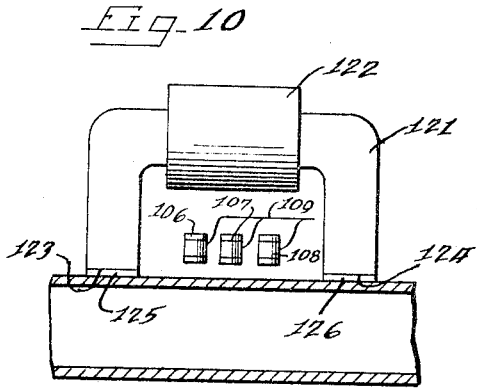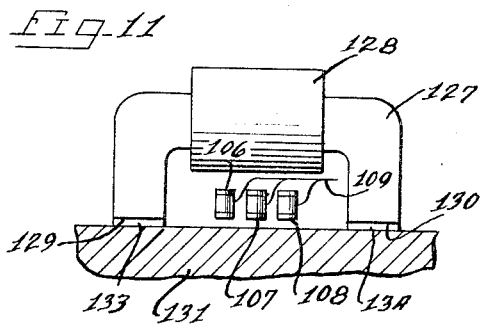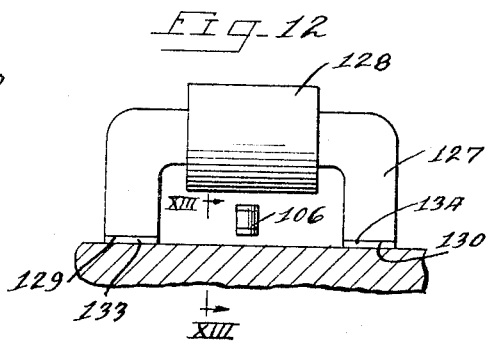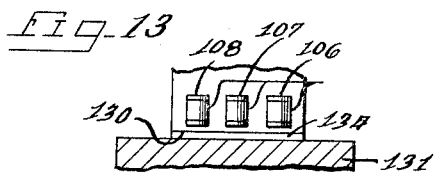
INVENTORS
John M. Mountz
John J. Flaherty
ATTORNEYS United States Patent Office 3,271,664
Patented Sept. 6, 1966

3,271,664
COMBINED LEAKAGE FIELD AND EDDY
CURRENT DETECTION SYSTEM
John M. Mountz, Niles, and John J. Flaherty, Elk Grove Village, Ill., assignors, by mesne assignments, to Magnaflux Corporation, Chicago, Ill., a corporation of Delaware
Filed Dec. 4, 1961, Ser. No. 156,680
8 Claims. (Cl. 324—40)

This invention relates to an eddy current testing system and more particularly to a system which permits highly accurate and reliable determination of characteristics of test pieces and very sensitive detection of inhomogeneities therein, particularly inhomogeneities located below the surface of a test piece.

Eddy current testing systems are well known in which an alternating current-excited coil is placed adjacent the surface of a test piece to induce a varying magnetic field and eddy currents therein, and in which the characteristics of the test piece and the existence of inhomogeneities are determined by measuring voltages induced from the varying field and eddy currents, either in the alternating current-excited coil or in one or more coils separate from the alternating current excited coil.

Such systems have been quite satisfactory in many applications but a great deal of difficulty has been experienced in other applications, particularly in the testing of ferrous materials having magnetic properties. In an attempt to test such materials, high intensity uni-directional biasing fields have been applied with the object of saturating the ferrous material to render it essentially non-magnetic. In some cases, the application of the saturating bias permits a satisfactory measurement, but in other cases it has left much to be desired.

This invention is based in part upon the discovery that a marked improvement in results can be obtained in many cases by using a biasing field intensity within a certain critical range of values which is quite low in relation to the values heretofore employed, the values being related to the magnetic characteristics of the test piece. It is possible to detect inhomogeneities located a substanial distance below the surface of a test piece and it is also possible to obtain a more sensitive indication of surface inhomogeneities.

Important specific features of the invention relate to apparatus and methods for obtaining optimum bias field values.

Further important features of the invention relate to magnetic yoke and test coil configurations for obtaining the optimum biasing field and obtaining a high degree of sensitivity.

Another important feature of the invention relates to the provision of separate leakage field and eddy current detector circuits. The leakage field detector circuit responds to relatively slowly changing signals such as induced during movement of a test piece, by passage under a test coil of a portion of the test piece having a distortion of the biasing field. The eddy current detector circuit does not respond to such slowly changing signals and responds only to eddy current induced signals. With such separation it is possible to determine the characteristics of a test piece with a high degree of accuracy, sensitivity and reliability.

Further important features relate to circuit arrangements for increasing sensitivity, accuracy and reliability of the system.

These and other objects, features and advantages will become more fully apparent from the following detailed description taken in conjunction with the accompanying drawings which illustrate preferred embodiments and in which:

FIGURE 6 is a view illustrating a modified test coil and bias arrangement usable in place of that of FIGURES 1 and 2;

FIGURE 7 is a sectional view taken substantially along line VII—VII of FIGURE 6, showing the orientation of test coils thereof;

FIGURE 8 is a view similar to FIGURE 7, illustrating a modified orientation of test coils;

FIGURE 9 is a view illustrating another test coil and bias arrangement usable in place of that of FIGURES 1 and 2;

FIGURE 10 is a view illustrating still another test coil and bias arrangement usable in place of that of FIGURES 1 and 2;

FIGURE 11 is a view illustrating a test coil and bias arrangement usable in place of that of FIGURES 1 and 2, in testing of flat-surfaced test pieces or the like;

FIGURE 12 is a view illustrating another test coil and bias arrangement usable in place of that of FIGURES 1 and 2, in testing of flat-surfaced test pieces or the like;

FIGURE 13 is a cross-sectional view taken substantially along line XIII—XIII of FIGURE 12.

Figure 1:
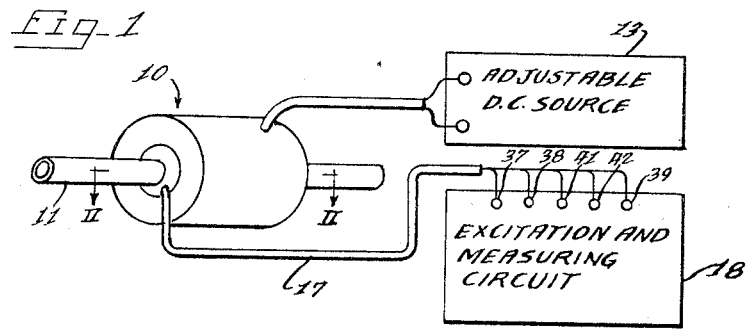
FIGURE 1 is a diagrammatic illustration of one preferred form of testing system constructed according to this invention, designed for the testing of rods or tubes.

Reference numeral 10 generally designates one preferred form of test coil assembly constructed according to the principles of this invention, designed for the testing of a cylindrical ferrous member 11 which may be in the form of a solid rod, or in the form of a hollow tube as illustrated. The tube 11 may, for example, be produced from sheet stock bent into cylindrical form with abutting edges thereof welded together to form a seam, the illustrated system being used to test the axially extending weld at the seam thus produced.

The illustrated assembly 10 comprises a bias coil 12 surrounding the tube 11 and connected through a cable to an adjustable D.C. source 13, to thus produce a unidirectional axial flux in the tube 11.

Figure 3:
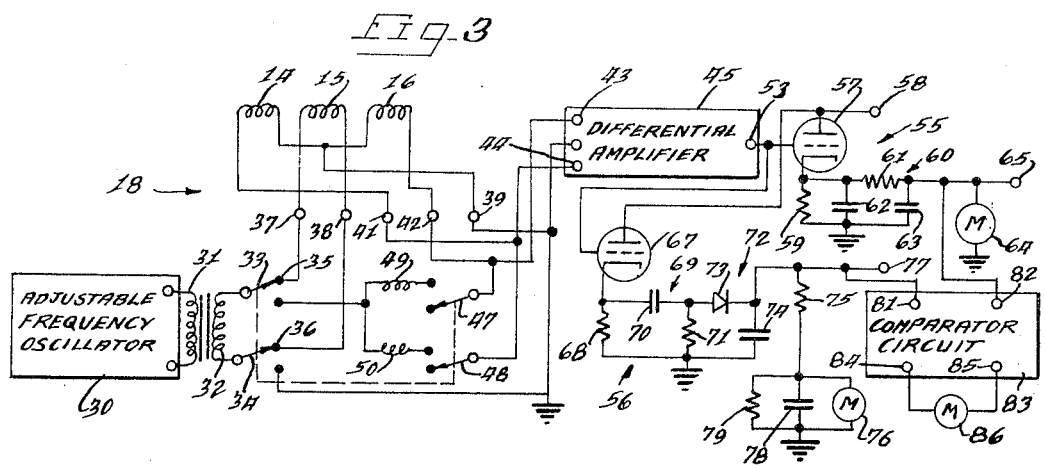
FIGURE 3 is a circuit diagram of an excitation and measuring circuit of the system of FIGURE 1.

Three test coils 14, 15 and 16 are positioned inside the bias coil 12, closely adjacent to and in surrounding relation to the tube 11, the coils 14–16 being connected through a multi-conductor cable 17 to an excitation and measuring circuit 18, which is shown in FIGURE 3, the center coil 15 being connected to an A.C. source and the end coils 14 and 16 being differentially connected together and to an amplifier and detector circuit, as described in detail hereinafter.

As illustrated, the test coils 14–16 are wound in annular slots in an insulating sleeve 19 fixed within another insulating sleeve 20 which is disposed within a sleeve 21 forming a core on which the bias coil 12 is wound. To permit testing of tubes of various sizes, the sleeves 19 and 20 together with the coils 14–16 may be removable, to be replaced by a similar assembly having different inside dimensions.

To concentrate the magnetic field of the bias coil 12 in the tube 11, the coil 12 is surrounded by an outer cylinder 22 of magnetic material and a pair of rings 23 and 24, also of magnetic material, extend radially inwardly from the opposite ends of the outer cylinder 22. Another pair of rings 25 and 26 of magnetic material are affixed to the ends of the sleeves 19 and 20 and extend radially inwardly from the inner surfaces of the rings 23 and 24 to points adjacent the surface of the tube 11.

As above indicated and as explained in detail hereinafter, the intensity of the biasing flux is quite important. The intensity of the biasing flux may be controlled by adjustment of the D.C. source 13 and/or may be controlled by the distance between the inner surface of the rings 25 and 26 and the outer surface of the tube 11. In the latter case, a pair of shim rings 27 and 28 of copper or other non-magnetic material are preferably disposed in said rings 25 and 26 to aid in maintaining coaxial relation of the parts and the proper flux distribution.

The rings 25–28 are preferably removable and replaceable with rings of different dimensions to accommodate rods or tubes of different dimensions and to obtain different values of biasing flux.

Referring to FIGURE 3, the exitation and measuring circuit 18 comprises an adjustable frequency oscillator 30 having output terminals connected to a transformer primary 31. A transformer secondary winding 32 is connected to ganged selector switch contacts 33 and 34 engageable with fixed contacts 35 and 36. Contacts 35 and 36 are connected to terminals 37 and 38 which are connected through conductors of the cable 17 to the center test coil 15. Thus an alternating current is applied to the center coil 15 to induce an alternating flux and eddy currents in the tube 11 and to induce voltages in the end coils 14 and 16.

The end coils 14 and 16 have terminals connected together and through a conductor of the cable 17 to a terminal 39 which is connected to ground. The other terminals thereof are connected through conductors of the cable 17 to terminals 41 and 42 which are connected to input terminals 43 and 44 of a differential amplifier 45. With this arrangement, a differential in the voltages applied to terminals 43 and 44 is produced in response to non-uniformities in the magnetic fields in the regions of the coils 14 and 16.

To obtain a modified form of operation, the differential coil terminals 41 and 42 are also connected to a pair of switch contacts 47 and 48 ganged to the contacts 33 and 34. Contacts 47 and 48 are engageable with fixed contacts connected to terminals of a pair of matched impedances in the form of inductances 49 and 50. At the same time, the contact 33 engages a fixed contact connected to the other terminals of both inductances 49 and 50 and contact 34 engages a fixed contact connected to ground. In this modified form of operation, the center coil 15 is not used and an A.C. signal is applied to coils 14 and 16 through the inductances 49 and 50. The relative currents through the coils 14 and 16 and the relative voltages thereacross are affected by the characteristics of the adjacent portions of the rod or tube, and any inhomogeneities in the rod or tube produce differences in the voltages developed at the input terminals 43 and 44 of the differential amplifier 45.

Figure 14:
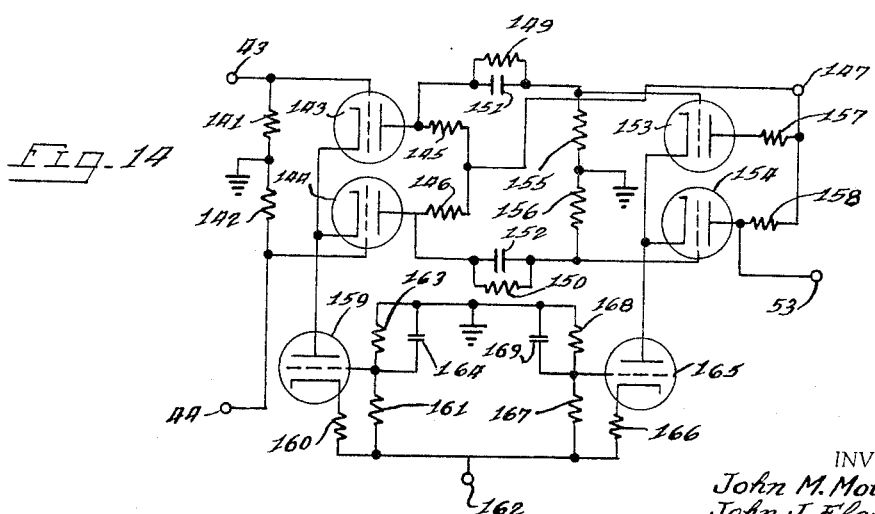
FIGURE 14 is a circuit diagram of a preferred form of differential amplifier usable in the circuit of FIGURE 3.

The differential amplifier 45 produces at an output terminal 53 thereof a signal proportional to the differential in signals at the input terminals 43 and 44. It preferably provides uniform amplification of D.C. signals and A.C. signals up to a frequency substantially beyond the highest operating frequency of the variable frequency oscillator 30. This is important in obtaining signal separation and uniform, accurate and reproduceable measurements. A preferred circuit for the differential amplifier is illustrated in FIGURE 14.

The output terminal 53 of the differential amplifier is connected to detector circuits 55 and 56 respectively referred to as a leakage field detector and an eddy current detector, for reasons explained hereinbelow. Leakage detector circuit 55 comprises a triode 57 operated as a cathode follower isolation circuit, the grid thereof being connected to the output terminal of the differential amplifier 45, the plate being connected to a positive power supply terminal 58 and the cathode thereof being connected through a resistor 59 to ground.

The output at the cathode of triode 57 is applied to a low-pass filter circuit 60 in the form of a series resistor 61 and a pair of shunt capacitors 62 and 63, having values such as to pass frequencies up to a frequency substantially less than the lowest frequency of operation of the oscillator 30. The output of the filter circuit 60 is applied to a meter 64 and also to an output terminal 65 which may be connected to an external alarm device or other form of indicating means.

The eddy current detector circuit 56 comprises a triode 67 operated as a cathode follower isolation circuit, the grid being connected to the output terminal 53 of the differential amplifier 45, the plate being connected to the power supply terminal 58 and the cathode being connected through a resistor 68 to ground.

The output signal at the cathode of triode 67 is applied to a high-pass filter 69 including a capacitor 70 and a resistor 71 in series, having values such as to pass frequencies above a frequency less than the lowest frequency of operation of the oscillator 30. The output of the high-pass filter 69 is applied to a rectifier or demodulator circuit 72 in the form of a diode 73 and a capacitor 74. The output of the demodulator circuit 72 is applied through a resistor 75 to a meter 76 and also to a terminal 77 for connection to an external alarm or other indicating means. A capacitor 78 and a resistor 79 are connected across meter 76 and cooperate with the resistor 75 in minimizing the application of high frequency signal components to the meter.

As above noted, the detector circuit 55 is referred to as a leakage field detector, while the detector circuit 56 is referred to as the eddy current detector. In particular, the detector circuit 55, with the low-pass filter 60 therein, does not respond to voltages induced by eddy currents at the frequency of the oscillator, and responds only to relatively slowly changing signals such as induced during movement of the tube 11, by passage under the differential detector coils 14 and 16 of a portion of the tube having a distortion of the biasing field. Such a distortion of the biasing field may be produced by a leakage path across a crack, defect or other inhomogeneity in the material of the tube.

The detector circuit 56 on the other hand does not respond to slowly changing signals caused by leakage paths, but does respond to signals induced in response to eddy currents in the portion of the tube adjacent the differential detector coils 14 and 16.

With the signal separation obtained with the two detectors, it is possible to investigate the leakage field and eddy current signals separately to determine whether only one or the other, or both, is most desirable in a particular application, and it is possible to more accurately and reliably evaluate the characteristics of a test piece. For example, if it is desired to detect certain types of defects, having certain orientations and other characteristics, preliminary tests may be performed with test pieces known to have such defects to develop data as to the response of both circuits to each type of defect. With such data, it is then possible to determine the characteristics of a test piece of unknown characteristics, with a high degree of accuracy and reliability.

In some cases it is desirable to combine and compare the outputs from the leakage field and eddy current detector circuits 55 and 56 and for this purpose, the outputs thereof may be applied to input terminals 81 and 82 of a comparator circuit 83 having output terminals 84 and 85 connected to a meter 86, the circuit being preferably adjustable to develop an output equal to either the sum or the difference of signals having adjusted proportions to the outputs of the detector circuits. By way of example, the outputs may be summed in circuits in which it is desired to detect defects having orientations and characteristics such as to produce outputs at both the leakage field detector 55 and the eddy current detector 56, while discriminating against defects having other orientations and characteristics. The difference between the outputs may be used when it is desired to discriminate against defects having orientations and characteristics such as to produce outputs in both detectors, while responding to other defects.

As above indicated, a highly important feature of the invention is in the use of a biasing field intensity within a certain critical range of values. Biasing fields have heretofore been used with the object of magnetically saturating a test piece of ferrous material so as to render it essentially non-magnetic. In all such cases, the intensity of the field has been quite large. It has been discovered, however, that a marked improvement in results can be obtained in many cases by using a biasing field intensity within a certain range of values which is quite low in relation to the values heretofore employed.

Figure 4:
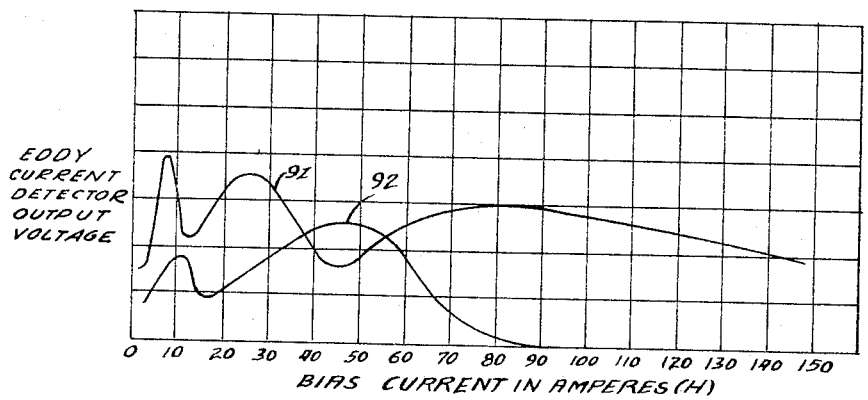
FIGURE 4 is a graph providing a representative illlustration of how output voltage varies with biasing current under certain conditions of operation of the system of FIGURES 1–3.

This feature is clarified by an analysis of the graph of FIGURE 4, which shows representative results obtained in testing certain test pieces of known characteristics. This graph is a plot of eddy current detector output voltage, obtained at meter 76 with a stationary test piece, versus current through the bias coil 12 in amperes, bias current being a measure of magnetizing force H. Curve 91 shows the output voltage obtained with a steel tube having an annular groove cut in the outer surface thereof, the groove having a depth approximately equal to 10% of the wall thickness. Curve 92 shows the output voltage obtained with an annular groove cut in the inner surface, the groove having a depth approximately equal to 10% of the wall thickness. It will be noted that the curve 91 has maximum points at biasing currents of less than 10 amperes, about 25 amperes and about 80 amperes with minimum values at slightly more than 10 amperes and at about 45 amperes. The curve 92 has peak values at about 10 amperes and at about 45 amperes with a minimum value at about 15 amperes. The curve 91 has a substantial value up to 150 amperes but decreases as the biasing current is increased therebeyond, while the curve 92 drops to substantially zero at 90 amperes and beyond.

The illustrated curves, which are representative, were obtained with an operating frequency of 5 kc. At lower frequencies, the outputs obtained at lower biasing current values tend to increase relative to the outputs at higher biasing current values and the peaks and valleys are more pronounced. At higher frequencies, the outputs obtained with the outer groove tend to increase at higher biasing current relative to the outputs obtained at lower biasing currents, while the outputs with the inner groove drop off more rapidly at high biasing current values. The peaks and valleys of the curves are less pronounced at higher frequencies.

With larger or smaller grooves, the output voltage curves have the same shape but are of different relative magnitudes.

For purposes of comparison, it may be noted that biasing fields have been used in similar systems with intensities corresponding to biasing current values of 150 amperes and upwards. It will be apparent that such high intensity fields do not produce optimum results particularly with respect to the detection of cracks or other inhomogeneities deep below the surface of a test piece. It will also be apparent that by careful selection of the biasing field intensities, the response to sub-surface inhomogeneities can be greatly increased relative to the response to surface inhomogeneities. To detect flaws close to the inside of a tube, for example, in the conditions represented by the graph of FIGURE 4, a biasing current of about 45 amperes might be used which would minimize the response to the surface inhomogeneities. To equalize response from the outside to the inside of a tube under such conditions, a somewhat higher or lower biasing current might be used, either at a value of around 40 amperes or at a value of around 55 amperes.

Figure 5:
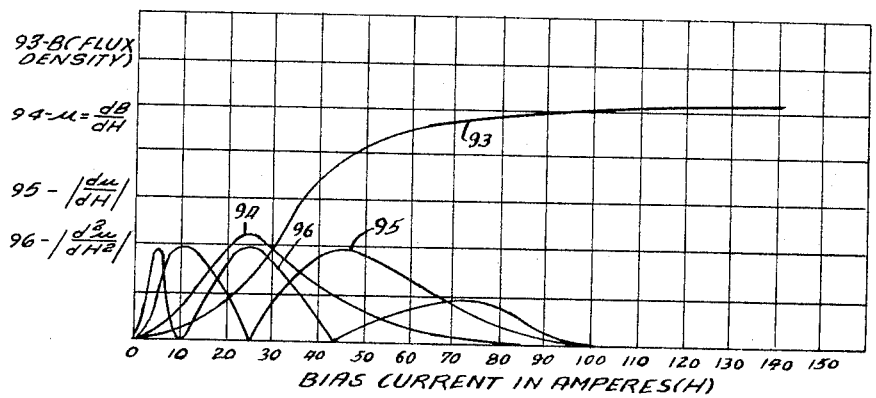
FIGURE 5 is a graph of the magnetic characteristics of a representative test piece.

The exact reasons for these greatly improved results are not known. Sufficient data has been developed, however, to demonstrate that the results are closely related to the form of the magneization curve of the material of the test piece. A representative magnetization curve is shown in FIGURE 5, wherein the curve 93 is a plot of flux density versus biasing current, curve 94 is a plot of permeability versus biasing current, this curve being the derivative of the curve 93. Curve 95 is the absolute value of the derivative of the curve 94 and curve 96 is the absolute value of the second derivative of the curve 94.

It will be noted that the maximum and minimum points of the curves 92 and 95 correspond closely, while the maximum and minimum points of the curves 91 and 96 correspond closely, thus indicating that the response to sub-surface defects is a function of the absolute value of the first derivative of permeability, while the response to surface defects is a function of the absolute value of the second derivative of permeability. It is further noted that the sensitivity of the system to sub-surface inhomogeneities is greatly improved in the range where the permeability has a substantial value, the said sensitivity being extremely low at saturation flux densities such as employed in the prior art.

It is also important to note that while it is possible to use no bias field at all or a bias field closely approaching zero, it is generally not desirable to do so for the reason that the measurements are then very sensitive to residual magnetic fields in the test piece and measurements are apt to be very erratic. It is usually desirable to use a bias field intensity in excess of that at which the first peak of the second derivative of permeability occurs, and preferably an intensity in excess of that at which the permeability is at a maximum, the system being then highly stable and yet very sensitive.

A modified test coil and bias arrangement is diagrammatically illustrated at FIGURE 6. In this arrangement, a test piece 100 is disposed between concave pole faces 101 and 102 of a generally C-shaped bias yoke 103 of magnetic material having a coil 104 wound thereon. The illustrated test piece 100 is a hollow tube formed by welding together abutting edges of sheet material bent into cylindrical shape, to form a seam 105. The seam 105 is tested by means of test coils 106, 107 and 108 which may be disposed either with their axes perpendicular to the adjacent surface of the test piece as shown in FIGURE 7, or on a common axis parallel to the surface of the test piece as shown in FIGURE 8. It is also possible to dispose the coils with their axes parallel to one another and in a plane parallel to the surface of the test piece.

The test coils 106, 107 and 108 are connected through a cable 109 to terminals 37-42 of the excitation circuit in the same way that the coils 14, 15 and 16 are connected thereto. Similarly, the coil 104 of the bias yoke 103 is connected to the adjustable D.C. source 13.

The bias field may be controlled by adjustment of the D.C. source 13 or by adjustment of the spacing between the pole faces 101 and 102 and the surface of the test piece 100. To maintain the spacing uniform, a pair of shims 111 and 112 of copper or other non-magnetic material are disposed between the pole faces 101 and 102 and the test piece.

To accommodate test pieces of different sizes, the pole faces are preferably on pole members 113 and 114 which may be removed and replaced with similar members having different sizes. It will be appreciated that this arrangement can be used with solid bars, and also with test pieces of square or other non-circular shapes by appropriate design of the pole members. The optimum field intensity can be obtained by adjustment of air gaps anywhere in the magnetic circuit, as well as by adjustment of the D.C. source or adjustment of the spacing between the pole faces and the test piece. In this embodiment, as well as in others, a permanent magnet may be used in the yoke in place of or in addition to the coil 104.

Figure 2:
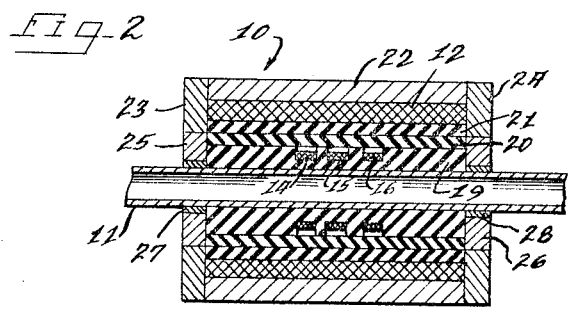
FIGURE 2 is an enlarged cross-sectional view of a coil assembly of the system of FIGURE 1, taken substantially along line II—II of FIGURE 1.

The operation of the arrangement of FIGURES 6–8 differs from that of FIGURES 1 and 2 with respect to the orientations of the biasing field and test coils with respect to the portions of the test pieces which are tested. In other respects, however, and particularly with regard to the considerations affecting the biasing field intensity, the operation is essentially the same as that obtained with the coil and bias arrangement of FIGURES 1 and 2.

FIGURE 9 illustrates a test coil and bias arrangement which is like that of FIGURES 6–8, except that the yoke 103 is replaced by a U-shaped bias yoke 115 having a coil 116 thereon and having pole faces 117 and 118 opposite portions of the test piece 100 which are more closely adjacent the seam 105, rather than diametrically opposite sides as shown in FIGURE 6. Shims 119 and 120 of copper or other non-magnetic material may be disposed between the pole faces 117 and 118 and the test piece. The coils 106–108 may be oriented as shown in FIGURE 7 or as shown in FIGURE 8, or may be disposed with their axes parallel and in a plane parallel to the surface of the test piece. An important advantage of this arrangement is that it can be used with test pieces of various sizes and shapes without modification.

FIGURE 10 illustrates another test coil and bias arrangement which is like that of FIGURES 6–8, except that the yoke 103 is replaced by a U-shaped bias yoke 121 having a coil 122 thereon and having pole faces 123 and 124 disposed opposite axially spaced portions of the test piece along the seam 105 therein. Shims 125 and 126 may be disposed between the faces 123 and 124 and the test piece. The coils 106–108 may be oriented as shown or as shown in FIGURE 8, or with their axes parallel and in a plane parallel to the surface of the test piece.

FIGURE 11 illustrates an arrangement using a U-shaped bias yoke 127 having a coil 128 thereon and having pole faces 129 and 130 disposed adjacent the surface of a test piece 131 which in this case may be a flat-surfaced plate, bar, block or the like. Shims 133 and 134 of copper or other non-magnetic material may be disposed between the pole faces 129 and 130 and the test piece. This arrangement is thus like those of FIGURES 9 and 10 except with respect to the form of the test piece. Test coils 106–108 may be oriented as shown, or as shown in FIGURE 8, or with their axes parallel to one another and in a plane parallel to the surface of the test piece.

FIGURES 12 and 13 illustrate how the coils 106–108 may be oriented in a plane at right angles to the plane of orientation in FIGURE 11. In this case, as in the others, the test coil axes may be perpendicular to the test piece as illustrated, or in alignment and parallel to the surface of the test piece as shown in FIGURE 8, or parallel to one another and in a plane parallel to the surface of the test piece.

Referring now to FIGURE 14, the input terminals of the differential amplifier 45 are connected through resistors 141 and 142 to ground and also to the grids of a first pair of triodes 143 and 144 having plates connected through resistors 145 and 146 to a positive power supply terminal 147. The plates are also connected through resistors 149 and 150 and parallel capacitors 151 and 152 to the grids of a second pair of triodes 153 and 154, a pair of resistors 155 and 156 being connected between ground and the grids of triodes 153 and 154 with the plates thereof being connected through resistors 157 and 158 to the positive power supply terminal 147, the plate of the triode 154 being connected to the output terminal 53.

The cathodes of the first pair of triodes 143 and 144 are connected together and to the plate of a triode 159 which provides in effect an extremely large cathode resistance but does not require a large voltage drop thereacross. The cathode and grid of triode 159 are respectively connected through resistors 160 and 161 to a negative power supply terminal 162, the grid being also connected to ground through the parallel combination of a resistor 163 and a capacitor 164. Similarly, the cathodes of the triodes 153 and 154 are connected to the plate of a triode 165 having its cathode and grid connected to terminal 162 through resistors 166 and 167, the grid being also connected to ground through the parallel combination of a resistor 168 and a capacitor 169.

This differential amplifier produces highly advantageous results in combination with the eddy current test coil and bias arrangements as illustrated. In such arrangements, the test coils produce relatively large voltages which are equal in the absence of an inhomogeneity and may differ only slightly in response to an inhomogeneity. However, both voltages may change together over a relatively large range in response to changes in operating conditions. When the voltages applied to the inputs are equal but increase together, for example, the conduction of both triodes 143 and 144 will increase and the conduction of both triodes 153 and 154 will decrease. However, the changes in conductions and the change in potential of the output terminal 53 will be relatively low to the high effective cathode impedances and degeneration in both stages, the plate resistors preferably having comparatively low values. If, however, there is any difference in the input voltages, the change in the output voltage is relatively high. Additional advantages of the amplifier circuit are in the direct coupling of the amplifier stages, permitting D.C. amplification which is very desirable in passing leakage fields signals separated out in the detector 55, and in the large degeneration of the stages, producing uniform amplification up to an extremely high frequency which is very desirable in detecting the eddy current signals which are separated out in the detector 56.

It is noteworthy that the oscillator 30 may be operated over an extremely wide range of frequencies, as low as 100 cycles per second or even lower and as high as 500 kc. or even higher. Thus the wide band pass characteristics of the amplifier 45 are highly desirable. It is also noteworthy that the system is much more accurate and stable in operation, with the signals being amplified together by the same differential amplifier, prior to application to the separate detector circuits.

It will be understood that modifications and variations may be effected without departing from the spirit and scope of the novel concepts of this invention.

We claim as our invention:

1. In a system for detecting either surface type defects or sub-surface type defects in a test piece of ferrous material having a permeability curve such that with an applied field increasing from zero toward a saturating value the absolute value of the first derivative of the permeability curve increases to a peak value at a first field strength value, then decreases to zero at a second field strength value, then increases to another peak value at a third field strength value and finally decreases to zero at a fourth relatively high saturating field strength value, test coil means disposed in proximity to a surface of said piece for inducing an A.C. field in said portion and inducing eddy currents therein and for developing a signal in response to said field and said eddy currents, and means for applying a unidirectional biasing field in said test piece having a value approximately equal to one of said second and third field strength values for producing a maximum change in said signal in response to one of said types of defects while producing a minimum change in said signal in response to the other of said types of defects.

2. In a system as defined in claim 1, said biasing field having a value approximately equal to said second field strength value for producing maximum change in said signal in response to surface type defects while producing a minimum change in said signal in response to sub-surface type defects.

3. In a system as defined in claim 1, said biasing field having a value approximately equal to said third field strength value for producing a maximum change in said signal in response to sub-surface type defects while producing a minimum change in said signal in response to surface type defects.

4. In a system for determining the characteristics of a test piece, a pair of differentially connected test coils in proximity to portions of the test piece, means for inducing an AC field of a certain frequency in said portions of the test piece to develop eddy currents in said portions and to develop signals in said coils in a frequency band which includes said certain frequency, means for inducing a biasing field in said test piece to develop signals in said coils in response to relative movement past said coils of portions of the test piece which produce a leakage field distortion of said biasing field, differential amplifier means for producing an output signal corresponding to the difference in signals produced by said differentially connected test coils, said amplifier means being arranged to uniformly amplify D.C. signal components and A.C. signal components to frequencies higher than the highest frequency of said A.C. field, first detector means responsive to components of said output signal at frequencies less than the lowest frequency of said A.C. field to respond only to said leakage field distortions of said biasing field, second detector means responsive to components of said output signal having frequencies higher than the lowest frequency of said A.C. field to respond only to said eddy current signals, and first and second indicating means respectively coupled to said first and second detector means and arranged for separately indicating said leakage field distortions and eddy current signals.

5. In a system as defined in claim 4, a comparator circuit responsive to the outputs of said first and second detector circuits.

6. In a system for determining the characteristics of a tubular test piece of ferrous material having a welded axially extending seam, test coil means disposed closely adjacent a portion of said seam for inducting an A.C. field in said seam to develop eddy currents therein and for developing a signal in response to said field and said eddy currents, said test coil means including a pair of differentially connected test coils in axially spaced relation along said seam, means for measuring changes in said signal, and means for producing a unidirectional biasing field extending transversely through said portion of said seam including a yoke of magnetic material having pole faces adjacent portions of the test piece on opposite sides of said portion of said seam.

7. In a system as defined in claim 6, said differentially connected test coils being of relatively small dimensions as compared to the diameter of said tubular test piece.

8. In a system as defined in claim 6, said pair of differentially connected test coils having spaced parallel axes in a plane extending through said seam and through the axis of said tubular test piece.

References Cited by the Examiner

UNITED STATES PATENTS

| | | | |
|---|---|---|---|
| 2,258,837 | 10/1941 | Zuschlag | 324—34 |
| 2,267,884 | 12/1941 | Zuschlag | 324—40 |
| 2,329,810 | 9/1943 | Zuschlag | 324—34 |
| 2,331,418 | 10/1943 | Nolde | 324—34 |
| 2,353,211 | 7/1944 | Zuschlag | 324—40 |
| 2,415,789 | 2/1947 | Farrow | 324—40 |
| 3,020,472 | 2/1962 | Cauley | 324—34 |
| 3,056,081 | 9/1962 | Hochschild | 324—37 |

FOREIGN PATENTS 575,480   4/1933   Germany.

WALTER L. CARLSON, *Primary Examiner.*

R. E. KLEIN, R. J. CORCORAN, *Assistant Examiners.*